Nov. 3, 1964   F. E. ADAMSON ETAL   3,155,811
ARC WELDING TORCH
Filed Sept. 21, 1961   3 Sheets-Sheet 3
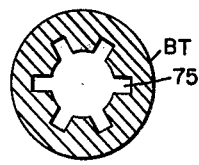
Fig.6.
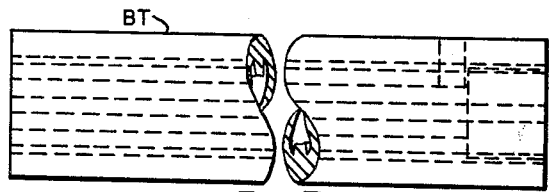
Fig.7.
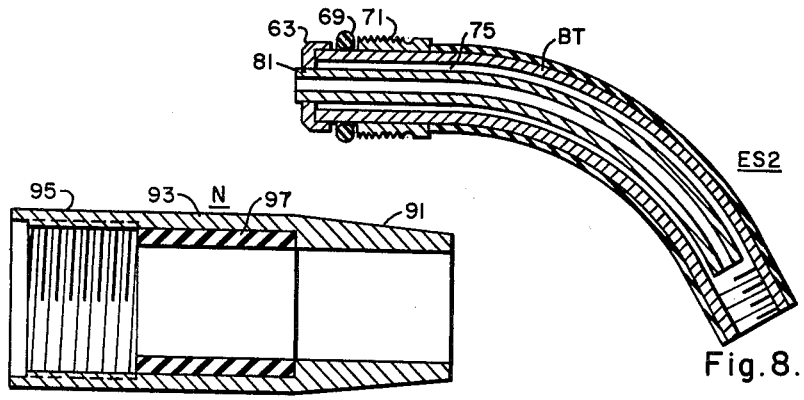
Fig.8.
Fig.9.
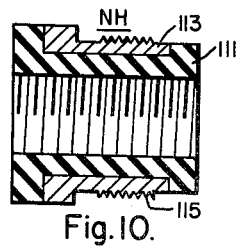
Fig.10.
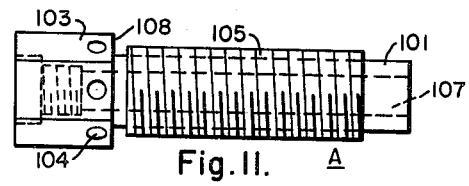
Fig.11.
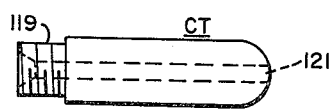
Fig.12.

3,155,811
ARC WELDING TORCH
Floyd E. Adamson, Kenmore, and Edward C. Denneny, Tonawanda, N.Y., assignors to Westinghouse Electric Corporation, East Pittsburgh, Pa., a corporation of Pennsylvania
Filed Sept. 21, 1961, Ser. No. 139,659
13 Claims. (Cl. 219—130)

This invention relates to the arc-welding art and has particular relationship to arc-welding guns or torches for welding work with a consumable electrode. Arc melting and arc heating are within the scope of this invention to the extent that this invention in its broader aspects may be applicable to such arts. To the extent of such applicability to arc melting and arc heating the expression arc welding as used in this application shall be taken to mean not only arc welding but also arc melting and arc heating.

A demand has arisen in the industry for a torch having the general shape of a goose-neck and having no pistol grip (for example, Miller 2,806,125). Such a torch is in many situations more readily maneuverable than a pistol-grip torch. A torch of the goose-neck form has advantages in welding relatively thin materials at relatively low currents, typically, currents of the order of 200 amperes. But such a torch may also be used in welding at far higher currents, 400, 500 and 600 amperes in some cases.

In arc-welding with such a torch in situations in which the heat radiated by the arc is comparatively low the water cooling frequently encountered in torches for welding at higher currents may be dispensed with. Typical of such situations where the water cooling may be omitted are as follows:

(1) When the welding arc is of the low current density type, usually described as "reactor technique" disclosed in application Serial No. 757,513, filed August 27, 1958 to Floyd E. Adamson et al. for Arc Welding Power Supply. The shielding gas may be $CO_2$, argon, or a mixture of these or other gases. The arc is in this case operating in the globular or drop transfer range and not in the spray transfer range described in Muller-Gibson-Anderson 2,504,868.

(2) When the arc is in the spray transfer range and the shielding gas is carbon dioxide, in this case, the torch may be larger to handle the increase in $I^2R$ losses in current carrying parts and the nozzle area must be somewhat larger as the current rating increases.

(3) When the arc is in the spray-transfer range and is shielded in inert gas but the duty cycle is less than 100%.

An arc in the reactor range or drop-transfer range with a $CO_2$ or argon shield or an arc in the $CO_2$ spray-transfer range radiates less heat to damage the nozzle than an arc in an inert atmosphere in the spray-transfer range. Most torches include water cooling because they were for inert-gas shielded welding in the spray transfer range up to 500 or 600 amps.

The torch under consideration here is usually provided with electrode-guide means which extends directly through the torch and with a shielding gas channel which extends directly through the torch generally parallel to the electrode-guide means. The torch terminates in a curved tip through the end of which the electrode passes. The portion from which the curved tip extends serves as a handle and in practice the torch is held by this portion with the tip of the electrode emerging from the terminal of the curved tip in welding relationship to the work. The torch here described is frequently called a straight through torch.

Straight-through torches in accordance with the teachings of the prior art lack the facility for ready manipulation demanded of such apparatus and it is an object of this invention to provide a highly flexible readily manipulated straight-through torch. It is another object of this invention to provide a straight-through torch including facilities for readily setting the curved tip of the torch reliably in the precisely desired welding relationship with the work being welded. An incidental object of this invention is to provide a torch in the use of which the consumable electrode shall be thoroughly purged of air or other gaseous contaminants before it is injected into the arc.

In accordance with this invention a straight-through torch having a swivel, curved tip is provided. The torch in accordance with the specific aspects of this invention includes the usual holder and curved tip but the electrode guide is made up of two sections one passing through the holder and the other continuing through the curved tip. These sections are contiguous, in electrode-transmission relationship, but the curved-tip section is rotatable through 360° about a bearing which is disposed near the junction of the two sections. This bearing includes provisions for taking up thrust as well as support for rotation. The provisions for taking up thrust is resilient; the resilience being imparted by a compressed O-ring or other readily yieldable component. The resilience of the bearing permits ready rotation of the curved tip.

In accordance with the specific aspects of this invention shielding gas flows through the torch and the path of the shielding gas includes the inside of the bearing. The O-ring in addition to performing the function of imparting resilience to the bearing also performs the function of sealing the inside of the bearing from the outside of the bearing. Thus the shielding gas is prevented from sucking atmospheric gases into the region of the weld.

Another feature of this invention is that a portion of the gas channel is contiguous to the electrode as it flows through the gun. This portion is near the arc and in this region the electrode is thoroughly purged.

The novel features considered characteristic of this invention are disclosed generally above. In its more specific aspects this invention both as to its organization and as to its method of operation together with additional objects and advantages thereof will be better understood from the following description of a specific embodiment taken in connection with the accompanying drawings, in which:

FIGS. 6 and 7 are views in side elevation and end elevation of the tube of curved tip which supports the electrode guide tube, following broaching or extending of the slots but before bending;

FIG. 8 is a view in longitudinal section of this tube following bending;

FIG. 9 is a view in section of the nozzle of this torch;

FIG. 10 is a view in section of the nozzle holder of this torch;

FIG. 11 is a view in side elevation of the adapter for this nozzle holder; and

FIG. 12 is a view in side elevation of the tip of the electrode guide through which the electrode emerges into the arc.

Figure 1:
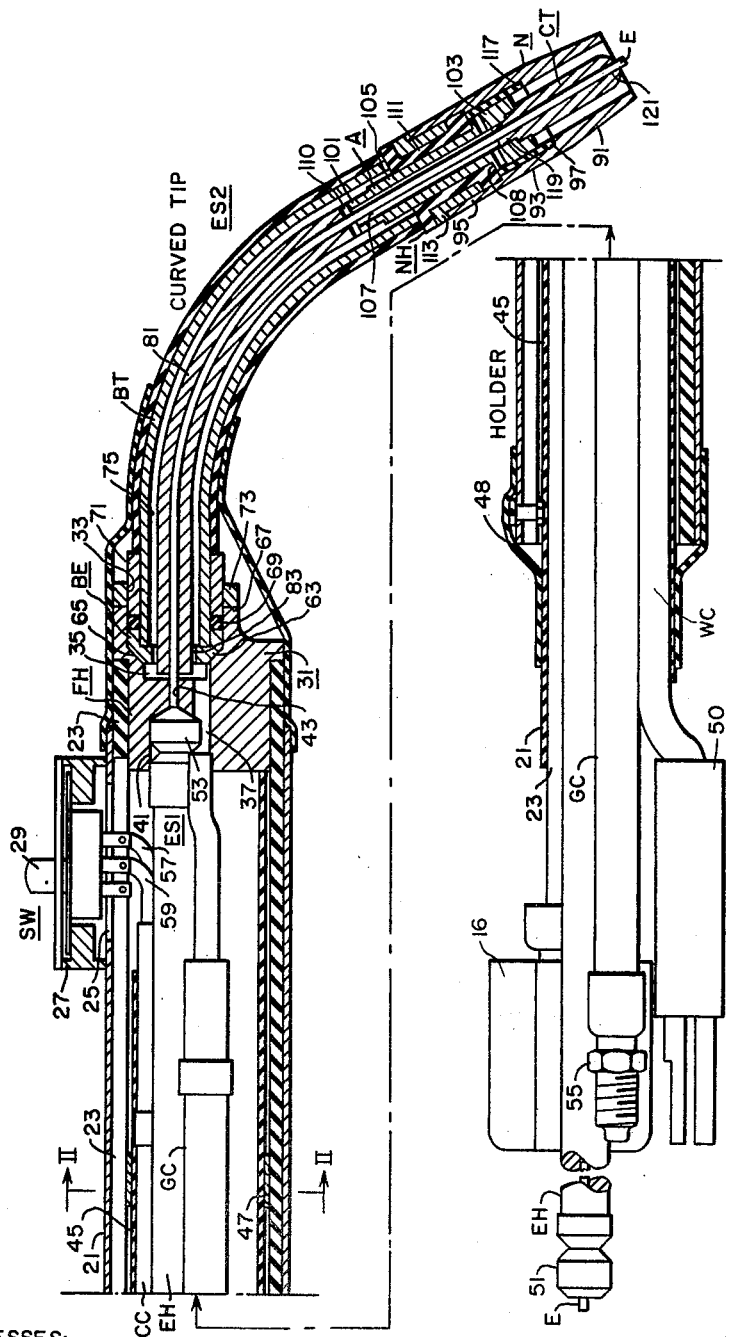
FIG. 1 is a view in longitudinal section of a straight-through torch in accordance with this invention.

The torch shown in the drawings includes a HOLDER and a CURVED TIP. The CURVED TIP is mounted to swivel about the HOLDER. The HOLDER includes a shell 21 of aluminum or other suitable metal which is provided with an insulating liner 23 for example of a phenolic condensation product. A push-button switch SW which must be held in the "On" position is secured over a slot 25 in the shell. The casing 27 of the switch engages the edges of the slot 25 and the switch is held by screws (not shown) in this casing. The liner 23 is slotted to accommodate the switch SW and the cable CC connected to the switch. The push-button 29 of the switch is movable longitudinally of the shell 21 to close the switch circuit and is automatically returnable to its open circuit position when released.

Figure 2:
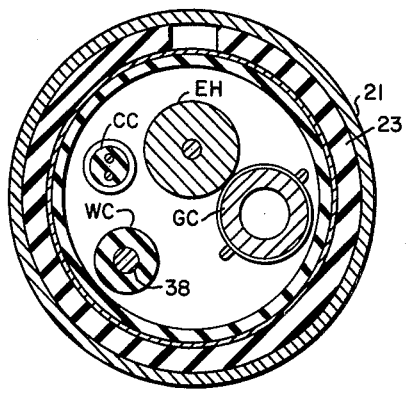
FIG. 2 is a view in transverse section taken along line II—II of FIG. 1 enlarged.
Figure 3:
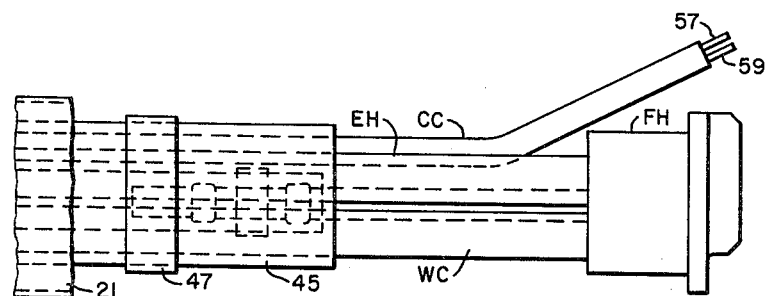
FIG. 3 is a fragmental view in side elevation showing a portion of the torch shown in FIG. 1 with the holder details removed.
Figure 5:
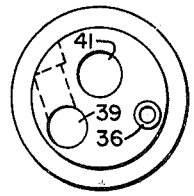
FIGS. 4 and 5 are a view in side elevation and in end elevation of the header of this torch.
Figure 4:
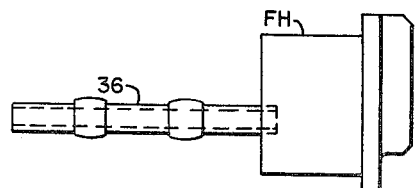

Near the inner end of the liner 23 a header FH is secured. The header FH (FIGS. 3, 4, 5) is of generally cylindrical section having an off-center shoulder 31 projecting from the front end. The off-center projection 31 of the HEADER has a circularly cylindrical shouldered hole 33 which accommodates the bearings BE of the CURVED TIP (FIG. 1). The inner wall of the hole 33 in the header FH is threaded. This hole 33 terminates in a disc-shaped chamber 35 which is connected to a tubular opening 37 passing through the rear portion of the header through which the shielding gas flows. The tube 36 (FIG. 4) of copper or other suitable material is secured gas tight in the opening 37 by brazing or in any other way. In addition to this opening 33 the header FH has rearward openings 39, 41 for connecting to the conductor 38 (FIG. 2) of the welding current cable WC and to the communicating portion of a flexible conduit EH for transmitting the electrode. The latter opening 41 communicates with a tubular opening 43 (FIG. 1) passing through the header FH towards the electrode guide section ES2 of the CURVED TIP.

The HOLDER also includes in addition to the welding current cable WC and the electrode hose EH the gas conductor GC. These components WC, CC, GC and EH are held together in a rubber tube 45 by a clamp 47 thus forming a unitary cable-and-hose assembly. This assembly is held firmly in the liner 23 with the aid of a boot 48 which engages the assembly and extends over the shell. This assembly extends into the tube formed by the shell 21 and the liner 23.

The welding current cable WC terminates at the outer end in a plug 50 adapted to be connected to the electrode drive control (not shown) which in turn is connected to a suitable power supply. At its inner end the conductor 38 of this cable WC extends into the header FH and is secured to the header by a set screw (not shown). The conductor 38 is thus electrically connected to the header FH.

The welding electrode E is passed through separate but communicating electrode-guide sections ES1 in the HOLDER and ES2 in the CURVED TIP. The section ES1 includes the electrode hose EH and the opening 43 in the header FH. The opening 43 terminates in the disc-shaped chamber 35 in the header FH. The hose EH is a tube of flexible steel wire having an opening adequate to transmit the welding electrode. This hose is provided with fittings 51 and 53 at each end, one, 51, extends outside of the HOLDER and is capable of accommodating a connection to an electrode supply (not shown) and the other, 53, extends into the opening 43 in the header FH. The fitting 53 has a groove where it is engaged by a set screw (not shown) secured through the header FH.

The gas conductor GC is a hose of insulating material which has a nipple 55 for connection to a gas supply secured to its outer end and is clamped to the tube 36 which extends from the header FH. Shielding gas flows through the conductor GC, through the tube 36 and through the longitudinal opening 37 in the header FH into the disc-shaped chamber 35 and thence through the CURVED TIP to the arc.

The control cable CC (FIG. 3) includes two conductors 57 and 59 which are connected to the switch SW at one end. At the other end the cable CC is provided with a three terminal plug 61. Two of the conductors are connected to two of the terminals (not shown). A third conductor (not shown) may extend from the third terminal and may be connected to the shell 21 of the HOLDER. This third terminal may be grounded so that the operator will be protected from injury.

The CURVED TIP includes the bearing assembly BE, the electrode-guide section ES2, a curved supporting broached tube BT for the electrode-guide section ES2, a nozzle N, a nozzle holder NH for the nozzle and an adapter A for the nozzle holder NH.

The bearing assembly BE is constructed to cooperate with a seal cap 63 which is brazed to the inner end of the broach tube BT. One component of this bearing is a tapered shoulder 65 on the header FH which is tapered towards the CURVED TIP and engages a corresponding tapered portion of the seal cap 63. This portion serves partly as thrust bearing and partly as bearing support for the CURVED TIP. Another bearing component is the portion 67 of the header FH which is contiguous to the tapered portion 65 and engages a corresponding cylindrical portion of seal cap. A third portion of the bearing assembly BE is an O-ring 69 which is compressed against the end of the seal cap 63 by a nut 71 which is at its inner end screwed onto the internal thread of the opening 33 in the header FH. This compressed O-ring 69 serves partly as resilient thrust bearing and partly as support bearing for the CURVED TIP. The nut 71 which compresses the O-ring is secured by a hexagonal securing nut 73 which is screwed onto the external thread of the compressing nut 71. The compressed O-ring 69 serves to permit the CURVED TIP to rotate readily and still to remain firmly in any position in which it is set. The O-ring also serves to prevent the penetration of atmospheric gases into the interior portion of the bearing assembly BE.

The broached tube BT is shown in its original unbent form in FIG. 6. This tube is formed from a tube of copper or other suitable material and is broached so that it has a plurality of rectangular projections 75 extending from a central opening. The slots 75 may also be extruded. The broached tube is threaded at the outer end and the seal cap 63 is then brazed to it. The portion 81 of the electrode guide section ES2 is then slipped into the opening in the broached tube BT and the tube is bent. After the tube is bent into the desired form (usually about a 60° arc) the compressing nut 71 and the O-ring 69 are slipped on it. The O-ring is slipped over the seal cap 63 and the compressing nut is slipped over the outer internally threaded end and moved up to the O-ring. A plurality of generally rectangular slots are formed between the broached tube BT and the portion 81. At one end these lots are contiguous to the seal cap 63 and at the other end open into the region beyond the electrode guide portion 81.

The broached tube BT as thus formed is slipped into the opening 33 in the header FH. The O-ring 69 is compressed by screwing the compression nut 71 into the header and the compression nut is secured by the hexagonal nut 73. The seal cap 63 has a central opening 83 which communicates with the disc-shaped chamber 35 in the header FH and shielding gas can flow through this opening into the generally rectangular channels between the portion 81 of the electrode guide section ES2 and the inner portion of the broached tube BT.

The nozzle N is composed of copper or other suitable material and is of generally cylindrical form tapered moderately externally at the exit end. Internally the nozzle includes a plurality of shoulders which extend between circularly cylindrical sections 91, 93, 95. The exit section 91 is bare. In the central section 93 there is a tube 97 of heat-resistant insulating material such as melamine which rests between the shoulder from which the exit portion extends and the next shoulder inwardly. The outer section 95 is threaded up to the insulating tube 97.

The adapter A for the nozzle holder is of generally cylindrical form including a projection 101 from a shoulder at one end and a hexagonal head 103 at the opposite end. The central portion 105 is externally threaded. The hexagonal head 103 is provided with holes 104 adjacent the center portion 105 and has an internal thread which extends from a shoulder centrally. The adapter has a central opening 107, the diameter of which is substantially greater than the diameter of any electrode E which is used with the torch. Typically this diameter may be of the order of .140 inch while the largest diameter electrode which is used with a typical torch is of the order of about .047 inch. But the torch may also be used with 1/16 inch and 3/8 inch electrodes in which case the base diameter must be still greater. The center portion 105 of the adapter A screws into the thread at the end of the broached tube BT with the shoulder 108, which is between the projection 103 and the center portion 105, engaging the nozzle holder NH. The end of the opening 107 is separated from, but coextensive with, the opening of the electrode guide portion 81 in this tube. The longitudinal grooves 75 in the broached tube BT are in communication with the central portion 107 of the adapter A through the gap 110 between the end of the electrode guide portion 81 in the broached tube BT and the end of the adapter A. The transverse openings 104 in the hexagonal head 103 of the adapter A communicate with the central opening 107 in the adapter so that gas flowing through the central opening may pass through the transverse holes.

The nozzle holder NH (FIG. 10) is of composite structure consisting of a bushing 111 of a higher temperature insulating material such as Durez and an outer shell 113 of a suitable heat resistant material such as stainless steel. The bushing 111 is of generally flanged cylindrical form having a circumferential groove in which the shell 113 is held. The bushing and the shell may be molded as a unit. The bushing 111 is threaded internally.

The shell 113 is of generally hollow, flanged cylindrical form including a threaded projection 115, the nozzle holder NH is screwed onto the central portion of the adapter A and the threaded end 95 of the nozzle N is screwed onto the thread 115 of the shell 113. With the nozzle N screwed onto the nozzle holder NH, the hexagonal head 103 of the nozzle adapter NA extends outwardly of the nozzle holder in a recess 117 provided between the insulating tube 97 in the nozzle N and the hexagonal head.

The electrode guide section ES2 includes in addition to the portion 81 in the tube BT the portion 107 in the nozzle-holder adapter A and a contacting tip CT which is dimensioned so as to provide reliable contact with the electrode E in the region of the arc. This contacting tip CT is of generally cylindrical form rounded off at one end and having a threaded stem 119 at the other end. The tip CT has a central opening 121 which is dimensioned to permit the electrode E to pass through but to assure contact with the electrode. Preferably there may be several tips CT which may be used interchangeably depending on the electrode to be supplied through the torch. The diameter of each tip should be a few thousandths of an inch greater than the diameter of the corresponding electrode.

The stem 119 of the tip CT is screwed into the internal threaded opening in the hexagonal head 103 of the adapter A with the shoulder resting against a shoulder of the threaded portion.

The shielding gas flows into the grooves 75 from the header FH, then through the space 110 into the opening 107 of the adapter A and then through the holes 104 in the hexagonal portion 103 into the recess 117 between the hexagonal portion and the adjacent insulator tube 97. Thence, the gas flows out through the end 91 of the nozzle N. The gas which flows through the center of the adapter A is in contact with the outer surface of the electrode E purging this electrode thoroughly before it enters the arc.

In the use of the torch the fitting at the external end of the electrode hose EH is connected to supply the electrode E from a reel (not shown) and the electrode is threaded through the torch passing through the electrode hose EH, the opening 43 in the header FH, the portion 81 of the electrode guide section ES2 in the tube BT, the central portion 107 of the adapter A and the opening 121 in the tip CT. The nipple 55 on the gas conductor GC is connected to a suitable gas supply. The main welding current power supply is connected to the plug 48 of the welding current conductor WC and the electrode drive control is connected to the plug 50 of the control current conductor CC. On the supply of gas, the gas flows through the nipple 55, the conductor GC, the opening 37 in the header FH, a hole (not shown) between the opening 37 and the disc-shaped chamber 35, the opening 83 between the seal cap 63 and the electrode guide portion 81, along the grooves 75 of the broached tube BT, the space 110 between the outer end of electrode guide portion 81 and the adapter A, the center 107 of the adapter along the electrode E, the holes 104 in the adapter head 103 and through the nozzle N.

In carrying out a welding operation the operator presses the button 29 longitudinally to the "On" position. This causes the electrode drive motor (not shown) to advance the electrode E through the electrode guide sections ES1 and ES2 and operates the valves of the gas supply to supply gas through the gas conductor GC. Power is also applied to the welding current conductor WC and through the welding current conductor and the header FH, the tube BT, adaptor A and the contacting tip CT to the electrode E. An arc may then be fired between the electrode and the work in the usual manner and the electrode may be fed into the arc in the usual manner. Firm electrical contact is established between the tip CT near the arc and the electrode E. There is then no substantial loss along the electrode guide sections ES1 and ES2 and no excessive heating of these guide sections. The electrode portion moving along the center of the adapter A is purged and the electrode is free of harmful gas film and sound welds are produced. The operator may set the CURVED TIP with the electrode in the most desired relationship with the work by turning the CURVED TIP to this position.

An important advantage of this apparatus is that the CURVED TIP is readily removable and replaceable and an operator may then readily replace tips to suit the peculiar conditions of each welding operation.

While a preferred embodiment of this invention has been disclosed herein many modifications thereof are feasible. For example in accordance with the broader aspects of this invention the swivel tip may not have the form of a smooth curve; it may be example be bent near the end. It would also be feasible to bend the arc by means of a magnetic field on the end of a staight swivel tip. The swiveling would then turn the magnet and turn the arc. This invention then is not to be restricted except insofar as necessitated by the spirit of the prior art.

We claim as our invention:

1. An arc welding torch for welding with a consumable electrode, comprising a nozzle, a main gas channel in communication with said nozzle for transmitting a shielding gas through said nozzle, and electrode guide means for transmitting said electrode and having electrode entrance means and electrode exit means, said exit means being in electrical contact with said electrode and terminating adjacent said nozzle, said guide means also having interposed between said entrance and said exit means, a sub-channel in communication with said main channel through which the main stream of said shielding gas is transmitted in contact with said electrode to purge said electrode.

2. An arc welding torch for welding with a consumable electrode, comprising a nozzle, a main gas channel in communication with said nozzle for transmitting a shielding gas through said nozzle, and electrode guide means for transmitting said electrode and having electrode entrance means and electrode exit means, said exit means being in electrical contact with said electrode and terminating adjacent said nozzle, said guide means also having interposed between said entrance and said exit means adjacent said exit means, a sub-channel in communication with said main channel through which the main stream of said shielding gas is transmitted in contact with said electrode to purge said electrode.

3. An arc welding torch for welding work with a consumable electrode including a holder, an electrode guide section in said holder for transmitting said electrode and having electrode inlet and electrode outlet terminals, curved electrode guide-section means in electrode transmission relationship with said outlet terminal for transmitting said electrode with the tip of said electrode in welding relationship with said work, bearing means adjacent said outlet terminal for mounting said guide-section means rotatable with respect to said holder and a channel for transmitting shielding gas to said tip, said channel including the interior of said bearing means, and said bearing means including a resilient seal for preventing air from penetrating into said shielding gas.

4. An arc welding torch for welding work with a consumable electrode including a holder, an electrode guide-section in said holder for transmitting said electrode and having electrode inlet and electrode outlet terminals, electrode guide-section means in electrode transmission relationship with said outlet terminal for transmitting said electrode with the tip of said electrode in welding relationship with said work, bearing means adjacent said outlet terminal for mounting said guide-section means rotatable with respect to said holder and a channel for transmitting shielding gas to said tip, said channel including the interior of said bearing means, and said bearing means including a resilient seal for preventing air from penetrating into said shielding gas.

5. A manual arc-welding torch for welding with a consumable electrode comprising a holder from which a curved swivel tip extends, said tip extending into said holder movable relative to said holder, said holder including swivel bearing means engaged by said tip and about which said tip is pivotal over a substantial angle in the normal use of said torch, said tip being pivotal about said bearing means by application of torque by direct physical engagement with said tip, said holder and tip also including coextensive electrode channels for transmitting an electrode through said holder and said tip, said channels remaining coextensive as said tip is swiveled, said bearing means including friction means for maintaining said tip in any position to which said tip is pivoted.

6. An arc-welding torch for welding with a consumable electrode comprising a holder from which a curved tip extends and electrode-guide means in said holder and tip for transmitting an electrode through said holder and tip with said electrode in welding relationship with said work as it leaves said tip, said electrode-guide means including separate sections movable relative to each other in said holder and tip when said torch is set for a welding operation, said sections being spaced so that the electrode is free to pass from the outlet of the section in said tip, and said tip and the associated section of said electrode-guide means being rotatable relative to said holder by application of torque by direct physical engagement with said tip, to facilitate the positioning of said electrode in welding relationship with said work in any position of said work.

7. An arc-welding torch for welding work with a consumable electrode including a holder, an electrode-guide section in said holder and curved guide-section means which, when said torch is set for welding, is separately movable relative to, but in electrode transmission relationship with, said electrode-guide section for positioning the tip of said electrode emerging from said curved guide-section means in welding relationship with said work, said curved guide-section means being rotatable with respect to said guide section by application of torque by direct physical engagement with said curved guide-section means to facilitate said positioning.

8. An arc-welding torch for welding work with a consumable electrode including a holder, an electrode-guide section in said holder for transmitting said electrode and having electrode inlet and electrode outlet terminals, bearing means adjacent said outlet terminal, and curved electrode-guide-section means mounted in said bearing means rotatable relative to said holder, when said torch is set for welding, by application of torque by direct physical engagement with said curved guide-section means, said curved guide-section means being in electrode transmission relationship with said outlet terminal for transmitting said electrode with the tip of said electrode emerging from said guide-section means in welding relationship with said work.

9. An arc-welding torch for welding with a consumable electrode comprising a holder from which a swivel tip extends, said tip extending into said holder movable relative to said holder, said holder including swivel-bearing means engaged by said tip and about which said tip is pivotal over a substantial angle in the normal use of said torch, said tip and holder also including coextensive electrode channels for transmitting an electrode through said holder and said tip, and coextensive gas channels for transmitting shielding gas to an arc produced by said electrode, said channels remaining coextensive as said tip is swiveled.

10. The torch of claim 9 wherein the electrode and gas channels pass through the bearing means and the bearing means includes means for suppressing the leakage of said gas.

11. An arc-welding torch for welding work with a consumable electrode including a holder, an electrode-guide section in said holder and guide-section means separately movable relative to, but in electrode transmission relationship with, said electrode-guide-section for positioning the tip of said electrode emerging from said curved guide-section means in welding relationship with said work, said guide-section means being rotatable with respect to said guide-section by application of torque by direct physical engagement with said guide-section means to facilitate said positioning.

12. An arc-welding torch for welding work with a consumable electrode including a holder, an electrode-guide section in said holder for transmitting said electrode and having electrode inlet and electrode outlet terminals, bearing means adjacent said outlet terminal, and curved electrode-guide-section means mounted in said bearing means rotatable relative to said holder, when said torch is set for welding, by application of torque by direct physical engagement with said guide-section means, said guide-section means being, and remaining as it is rotated, in electrode transmission relationship with said outlet terminal for transmitting said electrode with the tip of said electrode emerging from said guide-section means in welding relationship with said work, said bearing means including a thrust bearing and a bearing mounting said guide section for rotation.

13. An arc welding torch for welding work with a consumable electrode including a holder, an electrode-guide section in said holder for transmitting said electrode and having electrode inlet and electrode outlet terminals, bearing means adjacent said outlet terminal, and curved electrode-guide-section means mounted in said bearing means rotatable relative to said holder, when said torch is set for welding, by application of torque by direct physical engagement with said guide-section means, said guide-section means being, and remaining as it is rotated, in electrode transmission relationship with said outlet terminal for transmitting said electrode with the tip of said electrode emerging from said work, said bearing means including a resilient thrust bearing and a bearing mounting said guide section for rotation.

References Cited in the file of this patent

UNITED STATES PATENTS

| | | |
|---|---|---|
| 2,817,749 | Flood et al. | Dec. 24, 1957 |
| 2,836,705 | Cotter | May 27, 1958 |
| 2,881,305 | Wojciak et al. | Apr. 7, 1959 |
| 2,952,766 | Craig et al. | Sept. 13, 1960 |

FOREIGN PATENTS

| | | |
|---|---|---|
| 395,237 | Great Britain | July 13, 1933 |